United States Patent [19]
Danzer et al.

[11] Patent Number: 5,530,440
[45] Date of Patent: Jun. 25, 1996

[54] AIRPORT SURFACE AIRCRAFT LOCATOR

[75] Inventors: Paul M. Danzer, Norwalk; Leonard A. Carlson, Ridgefield, both of Conn.

[73] Assignee: Westinghouse Norden Systems, Inc, Norwalk, Conn.

[21] Appl. No.: 319,354

[22] Filed: Oct. 6, 1994

Related U.S. Application Data

[63] Continuation of Ser. No. 991,040, Dec. 15, 1992, abandoned.

[51] Int. Cl.$^6$ ...................................................... G08G 1/01
[52] U.S. Cl. .......................... 340/933; 340/961; 340/988; 342/29; 342/36; 364/461
[58] Field of Search ........................ 340/958, 933, 340/988, 961, 953, 989, 990, 991, 993, 994, 905, 947; 342/29, 36, 32; 364/439, 460, 449, 461

[56] References Cited

U.S. PATENT DOCUMENTS

| | | | |
|---|---|---|---|
| 3,152,327 | 10/1964 | Barker | 340/990 |
| 3,530,434 | 9/1970 | Stites et al. | 340/989 |
| 3,665,313 | 5/1972 | Trent | 340/988 |
| 3,697,941 | 10/1972 | Christ | 340/991 |
| 3,855,571 | 12/1974 | Massa | 340/990 |
| 3,872,474 | 3/1975 | Levine | 342/36 |
| 4,107,689 | 8/1978 | Jellinek | 340/991 |
| 4,819,174 | 4/1989 | Furuno et al. | 340/991 |
| 4,831,539 | 5/1989 | Hagenbuch | 340/988 |
| 4,857,886 | 8/1989 | Crews | 340/988 |
| 5,111,400 | 5/1992 | Yoder | 364/424.01 |
| 5,181,027 | 1/1993 | Shafer | 340/961 |
| 5,200,902 | 4/1993 | Pilley | 340/990 |
| 5,218,360 | 6/1993 | Goetz et al. | 342/407 |
| 5,243,340 | 9/1993 | Norman et al. | 340/933 |
| 5,291,411 | 3/1994 | Bianco | 340/992 |
| 5,347,274 | 9/1994 | Hassett | 340/988 |

FOREIGN PATENT DOCUMENTS 0289657  11/1988  European Pat. Off. .

OTHER PUBLICATIONS

Ervin F. Lyon, "Airport Surface Traffic Automation", The Lincoln Laboratory Journal, vol. 4, No. 2, 1991.

Walter F. Hollister, "Airport Surface Traffic Automation Study", Project Report ATC-156, Lincoln Laboratory, May 9, 1988.

Primary Examiner—Brent A. Swarthout
Attorney, Agent, or Firm—C. O. Edwards

[57] ABSTRACT

A system for identifying the location of an aircraft on the surface of an airport includes a plurality of low power FM transmitters located along the boundaries of runway and taxiways. Each transmitter provides an FM signal having a common carrier frequency and each FM signal is encoded with unique information indicative of the position of the transmitter on the airport surface. Aircraft and other vehicles containing a conventional FM receiver "capture" only the strongest signal and process the "captured" signal to determine which transmitter was the source of the signal and hence where the aircraft is on the airport surface.

10 Claims, 3 Drawing Sheets

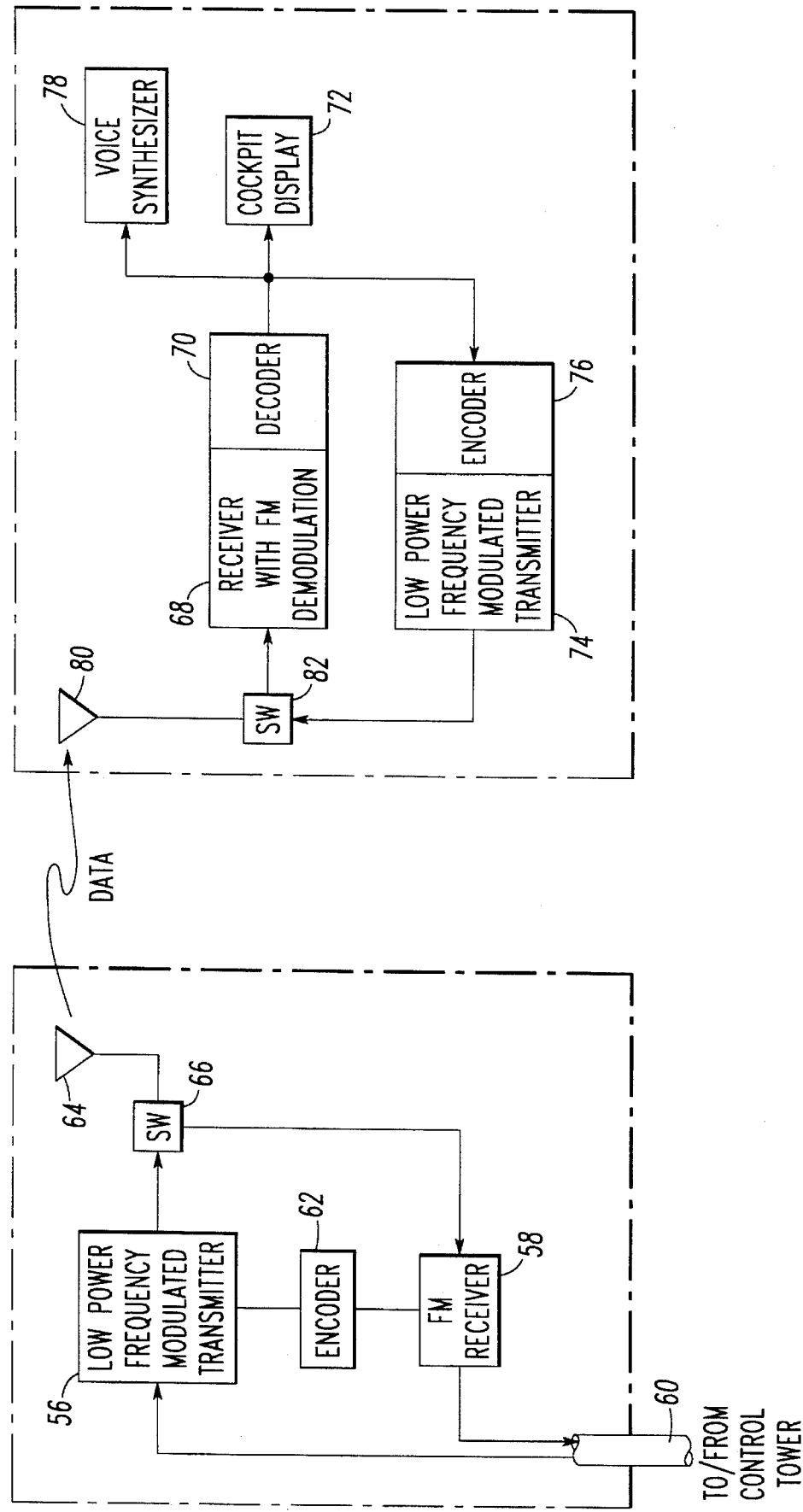

AIRPORT SURFACE AIRCRAFT LOCATOR

This is a Continuation of application Ser. No. 07/991,040 filed Dec. 15, 1992, and now abandoned.

TECHNICAL FIELD

This invention relates to an airport ground traffic control system, and more particularly to a system for determining aircraft position on the airport surface and for providing warnings of potential collisions.

BACKGROUND ART

Unauthorized incursions of aircraft and ground vehicles onto runways and taxiways can often have catastrophic results. The number of aircraft accidents that occur on the ground is nearly three times the number of aircraft accidents that occur in the air.

In degraded visual conditions the problem becomes even greater since the ground controller is often reliant on non-visual information such as voice communication from the cockpit crew reporting the aircraft's current position on the airport surface, or display information from a ground surveillance radar system. Unfortunately, only twelve airports in the United States have ground surveillance radar systems to aid the controller. The remainder of the U.S. airports depend on the visual observations of the controller and position reports from pilots. The problem gets even worse. The twelve surface radar systems that do exist are often over twenty-five years old, difficult to maintain, and provide ironically inadequate information in poor weather when radar is needed most. As a result, the controller in the tower is almost completely reliant on his visual observations and surface position reports from aircraft crew to provide situational awareness of the current state of the airport surface. In degraded visual conditions, the controller is often asking the question "where are you?" to aircraft crews to provide his situational awareness of the airport surface. As a result, the controller has to maintain a mental image of the airport surface, rather than having hard surveillance data available.

The current state of surface traffic control and several solutions to this problem are discussed in an article entitled "Airport Surface Traffic Automation" in The Lincoln Laboratory Journal, Volume 4, Number 2, 1991 by Ervin F. Lyon. The article discusses several alternatives such as the Airport Surface Traffic Automation (ASTA) plan of the Federal Aviation Administration, and the Airport Movement Area Safety System (AMASS) currently under development by Norden Systems, a subsidiary of the assignee of the present invention. AMASS operates in conjunction with and receives radar data from an ASDE-3 ground surveillance radar which utilizes high resolution radar electronic surveillance to provide tower controllers with all weather surface surveillance capability. AMASS processes the ASDE-3 data to detect and track airport ground traffic, predict where the aircraft/vehicles will be a fixed time later (e.g., 10 seconds), and alert controllers of possible runway incursions and ground collisions with sufficient time to allow corrective action to be taken.

The ASTA system envisions incorporating the functions of the ASDE-3 and AMASS, along with a system of automatic runway status lights to improve the situational awareness of the pilots and vehicle operators. Other variations of the ASTA system include even greater sophistication and fusion of data to provide an elaborate system to provide better airport surface situational awareness information.

Each of the alternatives proposed in The Lincoln Laboratory Journal paper is a technically feasible system that is sorely needed. However, these systems may be prohibitively costly and complex to make widespread availability possible.

A lower cost, near term system is required to solve the problems of airport surface control, thus enhancing airport safety and reducing delays.

DISCLOSURE OF THE INVENTION

An object of the present invention is to provide ground situational awareness information to aircraft on the airport surface.

Another object of the present invention is to generate and display status information indicative of the current aircraft position on airport runways, taxiways, and other critical airport ground traffic areas.

Yet another object of the present invention is to provide warnings, cautions, and advisories to aircraft to allow pilots to take preemptive action to avoid ground collisions and unauthorized entry onto active runways.

A further object of the present invention is to provide ground situational awareness information to airport ground controllers in the airport tower.

According to the present invention, a plurality of low power FM transmitters are located along the boundaries of runway and taxiways, each transmitter provides an FM signal having a common carrier frequency and each signal is encoded with unique information indicative of the position of the transmitter on the airport surface; aircraft and other vehicles containing a conventional FM receiver, "capture" only the strongest signal and process the "captured" signal to determine which transmitter was the source of the signal and hence where the aircraft is on the airport surface.

The present invention provides aircraft crew and air traffic controllers with situational awareness information indicative of aircraft and vehicle position on the airport surface.

These and other objects, features and advantages of the present invention will become more apparent in light of the following detailed description of a preferred embodiment thereof, as illustrated in the accompanying drawings.

BRIEF DESCRIPTION OF THE DRAWINGS

FIG. 4 is a functional block diagram of an alternative embodiment in which the aircraft includes a transmitter for transmitting aircraft identification and location information to the control tower.

BEST MODE FOR CARRYING OUT THE PRESENT INVENTION

Figure 1:
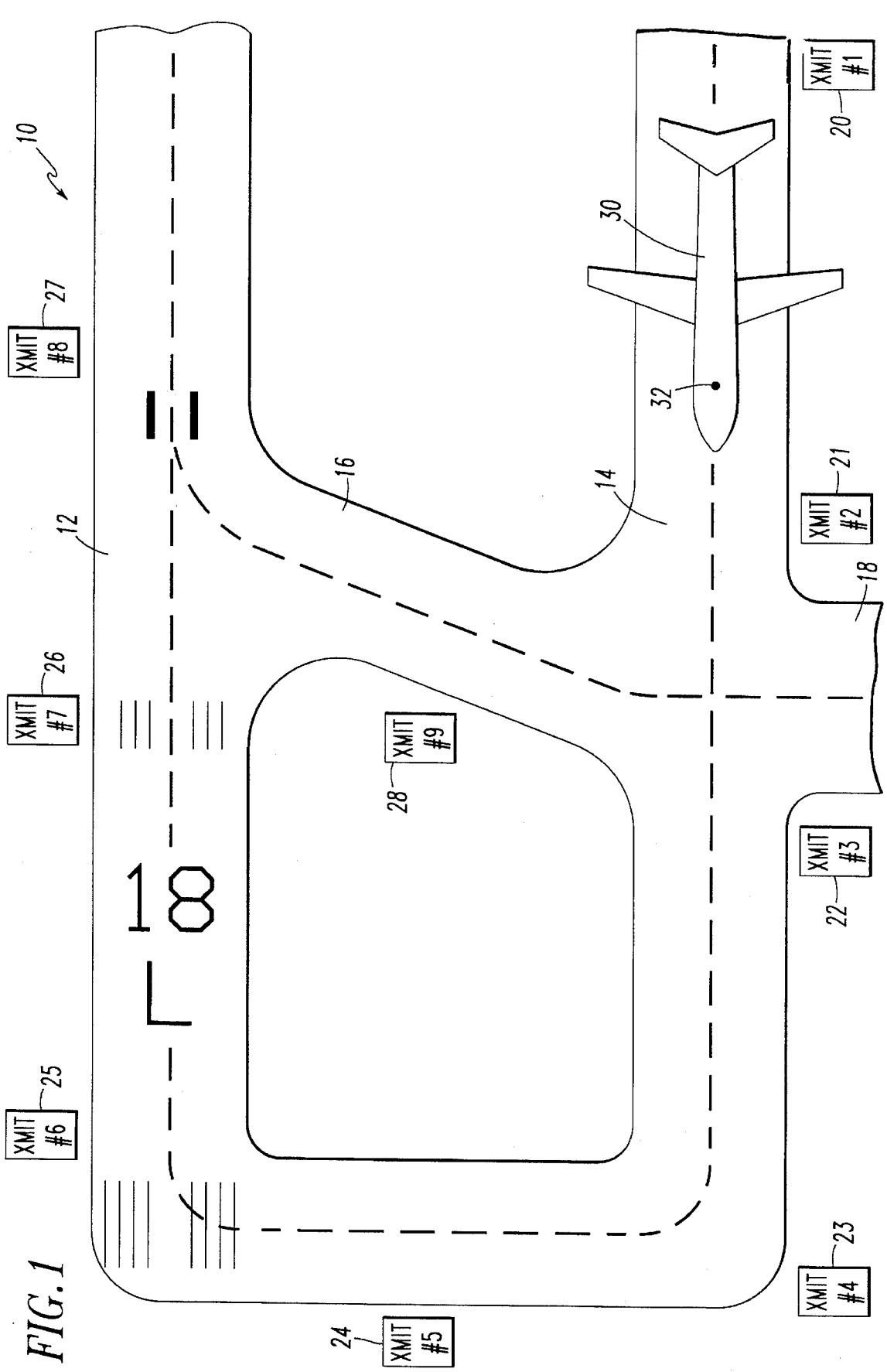
FIG. 1 is an illustration of the operational environment of the present invention.

Referring to FIG. 1, the operational environment of the present invention is the surface of an airport 10. The airport includes at least one runway 12 and several taxiways 14,16, 18 along which are a plurality of frequency modulated (FM) transmitter systems 20–28 having a common carrier frequency signal value. Each transmitter system 20–28 radiates a low power FM signal on the order of several milliwatts (e.g., 2 mw), and the signal is encoded with data uniquely indicative of the transmitter's location on the airport surface. As an aircraft 30 moves along the surface of the airport it receives the signals from transmitters 20–28 at an antenna 32. The antenna 32 may also be located on the bottom of the aircraft fuselage.

Figure 2:
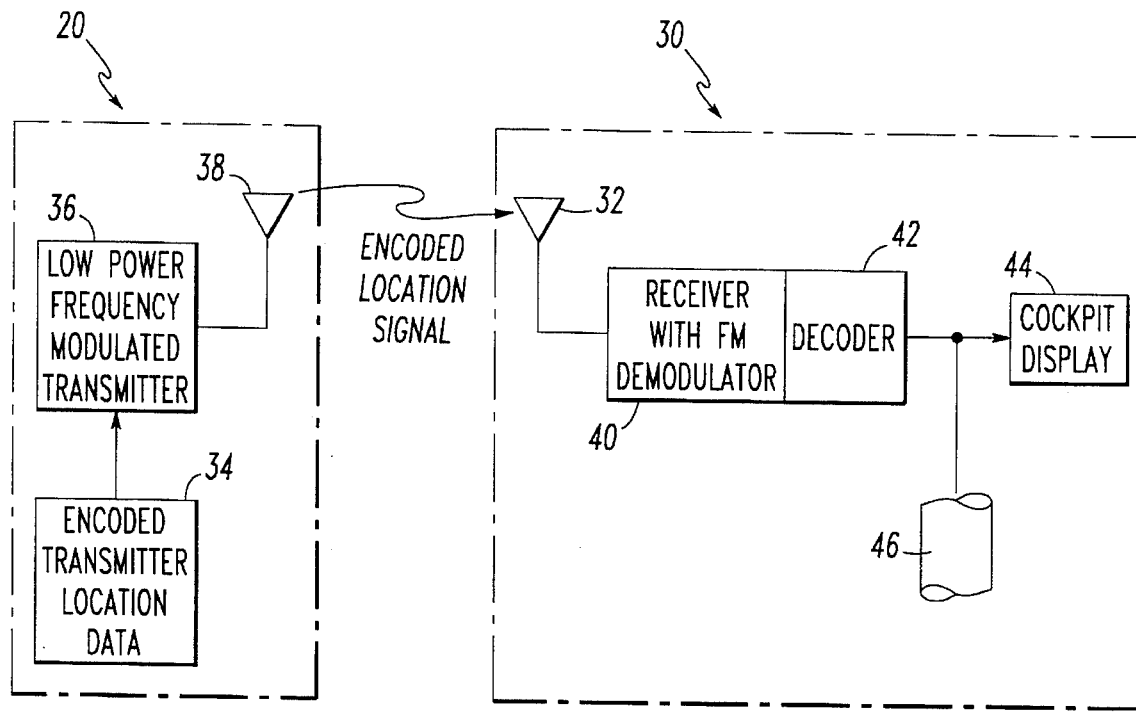
FIG. 2 is a functional block diagram of a transmitter and receiver according to the present invention.

Referring to FIG. 2, each transmitter system includes an encoder 34 which provides an encoded signal indicative of the location to a low power transmitter 36. The transmitter 36 embeds the encoded location data in an FM signal and provides the FM signal to an antenna 38. The aircraft includes the antenna 32, a receiver 40, and decoder 42 which receive, demodulate and decode the received signal to determine which transmitter system 20–28 the encoded location data is associated with. The decoder 42 provides a signal indicative of the transmitter which generated the captured signal (hence location) to a cockpit display 44, and to an aircraft data bus 46 (e.g., ARINC 429 or 629). The location information is provided on the data bus 46 to allow other aircraft systems such as the navigation system to access the aircraft position information. The present invention is best illustrated by an example.

Figure 3:
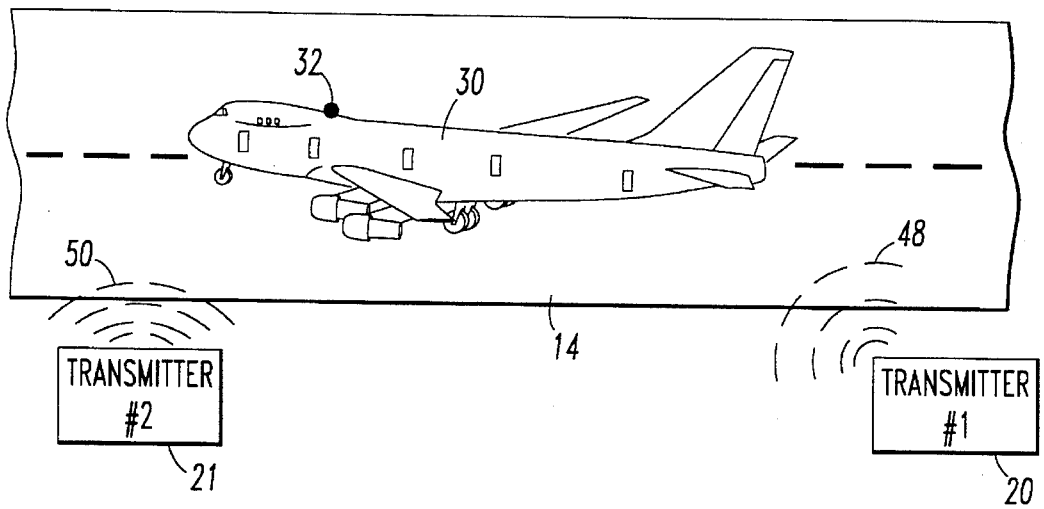
FIG. 3 is an illustration of an aircraft containing the receiver of FIG. 2 moving along a taxiway having transmitters located adjacent thereto.

Referring to FIGS. 2 and 3, as the aircraft 30 moves down one of the taxiways 14, it receives several encoded location signals from the transmitter systems 20,21. The receiver 40 utilizes the well known FM capture affect and is "captured" by the strongest of the received encoded location signals. The strongest received signal is indicative of the transmitter system (e.g., 20,21) which is currently closest to the aircraft. As an example, as the aircraft moves along the taxiway 14 it receives a first signal 48 (FIG. 3) from transmitter #1, and a second signal 50 (FIG. 3) from transmitter #2. Since the aircraft 30 is closest to transmitter #2 21, the first signal 50 "captures" the receiver 40 and information indicative of the fact that the aircraft is closest to transmitter #2 will be shown on the display 44 (FIG. 2).

"Capture" is well known in the radio arts, and the basic requirement for capture is that the ratio of the desired signal (e.g., signal 50) to undesired signal (e.g., signal 48 or noise) is not exactly equal to one. Then assuming that the bandpass of the receiver 40 is sufficiently flat so all the signals within the bandpass are treated similarly, independent of the amplitude, the average phase change over one cycle in the presence of signal plus interference will be zero. In the present case the average frequency is that of the signal from the transmitter closest to the aircraft (i.e., transmitter #2 21) and therefore the signal 50 "captures" the receiver 40. The well known principal of FM capture is discussed on pages 50–54 in the book entitled "Frequency Modulation Receivers" authored by A. B. Cook and A. A. Life, published by Prentice Hall, 1968.

There will be a small region between transmitter systems where the information may be untrustworthy because the two or more transmitters are approximately equidistant from the aircraft. However, this problem is easily resolved using well known methods such as time integration (i.e., filtering) to ensure that a new signal has been captured a sufficient time before changing the display information.

The present invention is not limited to providing information to only the aircraft crew. FIG. 4 illustrates a functional block diagram of an alternative embodiment 54 which has the additional benefit of providing aircraft identification (ID) and location to controllers in the tower, and warnings to the aircraft crew. Rather than just a transmitter located being along the taxiway and runway boundaries, the alternative embodiment includes both a transmitter 56 and a receiver 58 which interface with the control tower via a data link 60. An encoder 62 provides the transmitter 56 with a position signal which is uniquely indicative of the transmitter's location on the airport surface in substantially the same manner as the encoder and transmitter 34,36 of FIG. 2. An antenna 64 both receives and radiates data, and the routing of signals to/from the antenna is controlled by a switch 66.

In this alternative embodiment the aircraft includes a receiver 68, a decoder 70, and a cockpit display 72 which operate in substantially the same manner as their counterparts in FIG. 2. A low power FM transmitter 74 and an encoder 76 have been added to the aircraft 30 along with a voice synthesizer 78. The aircraft also includes an antenna 80 and a switch 82 for controlling the routing of signals to and from the antenna 80.

The airport transmitter 56 generates an FM signal containing encoded information indicative of its location on the airport surface. The aircraft receiver 68 is "captured" by the FM signal of the airport transmitter the aircraft is closest to, and the aircraft transmitter transmits the location information along with the aircraft identification back to the airport receiver 58. The airport receiver 58 then provides that location and aircraft identification information to the control tower via the data link 60. An automated collision avoidance system (not shown) located in the control tower may then process the location and ID information from all the aircraft operating on the airport surface and provide warnings, cautions or advisors to the controllers and aircraft crew. These warnings, cautions, or advisors are sent to the cockpit display 72 and the voice synthesizer 78 which provide the necessary information to the pilot. A digital data link such as a Mode S transponder may be used to transmit the identification and location data directly to the controller tower, rather than transmitting to the airport receiver 58 located adjacent to the runway or taxiway, and routing the information to the tower via the data link 60.

While the present invention has been described in connection with transmitters 20–28 positioned as shown in FIG. 1, one skilled in the art will appreciate that the invention is clearly not so limited and that the number of transmitters and their location is site specific. That is, since each airport is designed slightly different with different arrangements of runways and taxiways, the positioning of the transmitters will be dependent upon the lay-out of the airport. Furthermore, the invention is clearly not limited to only large commercial aircraft. Military and general aviation aircraft, along with airport vehicles (e.g., snow plows and fire engines) can also benefit from the present invention. The information encoded into the transmitted FM signal is also not limited to position data. Other information such as warnings that the aircraft is on the active runway may also be encoded into the transmitted FM signal from transmitter 36. Aircraft and other airport vehicles containing a conventional FM receiver, "capture" only the strongest FM signal and process the "captured" signal to determine which transmitter was the source of the signal and hence where the aircraft is on the airport surface.

Although the present invention has been shown and described with respect to a preferred embodiment thereof, it should be understood by those skilled in the art that various other changes, omissions, and additions may be made to the embodiments disclosed herein, without departing from the spirit and scope of the present invention.

We claim:

1. An airport vehicle collision avoidance system which is located along an airport surface to communicate with vehicles on the airport surface, said system comprising:

a. an encoder for generating an encoded position signal indicative of a unique location on the airport surface;

b. a low power FM transmitter located at said unique location which generates an FM signal containing said encoded position signal, and transmits said FM signal to the vehicle where said FM signal is received by using the frequency modulation capture effect;

c. a receiver associated with said transmitter which receives a signal from the vehicle indicative of the vehicle identity and vehicle position on the surface of the airport;

d. means for transmitting said signal received from said vehicle to a display; and e. a vehicle transmit/receive unit having an omni-directional antenna which receives said encoded position signal, a vehicle receiver which detects and signal processes said encoded position signal and provides a detected position signal to determine the position of the vehicle on the airport surface, a low power vehicle transmitter which transmits a status signal indicative of both the vehicle identity and the vehicle position on the surface of the airport, and a display responsive to the status signal, said display displaying information indicative of vehicle identity and vehicle position; wherein said receiver also receives warning/caution/advisory data, said transmitter also transmits warning/caution/advisory data, said warning/caution/advisory data including at least one of vehicle proximity data and vehicle collision data and active runway data, said vehicle acquiring said FM signal using the FM capture effect, said vehicle receiver providing the detected position signal to at least one of a cockpit display and an aircraft data bus, and said system further comprising a switch connected between said antenna and said transmitter, and said antenna and said receiver, for routing respective transmitted signals from said transmitter to said antenna, and respective received signals from said antenna to said receiver.

2. The airport vehicle collision avoidance system of claim 1 wherein said low-power vehicle transmitter further comprises means for encoding the vehicle identity and vehicle position information into a Mode S format such that said status signal includes the vehicle position and identity information encoded in said Mode S signal format.

3. A collision avoidance apparatus for use with an airport vehicle having a vehicle receiver and a vehicle transmitter, said airport vehicle on an airport surface, comprising:

a. a plurality of frequency modulated transmitters;

b. each of said plurality of frequency-modulated transmitters having a common carrier frequency signal;

c. each of said plurality of frequency-modulated transmitters being placed at a respective predefined location on said airport surface;

d. each of said plurality of frequency-modulated transmitters having an encoder for generating an encoded position signal indicative of said respective predefined location;

e. each of said plurality of frequency-modulated transmitters modulating said encoded position signal onto said common carrier frequency signal, thereby generating a location signal;

f. each of said plurality of frequency-modulated transmitters having an antenna and providing said location signal thereto;

g. each of said plurality of frequency-modulated transmitters transmitting a respective predefined location signal based on a predefined location including an identification component to a receiver on said airport vehicle, said airport vehicle engaging a selected location signal using the frequency-modulation capture effect;

h. a plurality of frequency-modulated receivers;

i. each of said plurality of frequency-modulated receivers being associated with a respective one of said plurality of frequency-modulated transmitters;

j. each of said plurality of frequency-modulated receivers receiving from said vehicle transmitter a vehicle signal of said airport vehicle indicative of at least one of a vehicle identity and a vehicle location on said airport surface; and k. means for transmitting said vehicle signal to a display.

4. The apparatus of claim 3 further comprising a vehicle transceiver having a. a vehicle antenna capable of receiving information signals from a plurality of frequency-modulated transmitters, said plurality of frequency-modulated transmitters being located on said airport surface;

b. a vehicle receiver connected to said antenna for engaging one of said plurality of frequency-modulated transmitters using the frequency-modulation capture effect producing a selected information signal thereby, said selected information signal containing said selected location signal, said selected location signal being unique to the location of said one relative to said airport surface;

c. a decoder connected to said vehicle receiver for decoding said selected information signal and providing a decoded information signal to at least one of a vehicle display and a vehicle data bus, said decoded information signal including a decoded location signal indicative of the location of said one relative to said airport surface;

d. a vehicle transmitter for transmitting a status signal indicative of at least one of a vehicle identity and a vehicle location on said airport surface; and e. a display responsive to said status signal and displaying vehicle information indicative of at least one of said vehicle identity and said vehicle location.

5. The apparatus of claim 3 wherein each of said plurality of frequency-modulated transmitters also transmits warning/caution/advisory data obtained from an external source, each of said frequency-modulated receivers also receive warning/caution/advisory data, and said warning/caution/advisory data including at least one of vehicle proximity data and vehicle collision data and active runway data.

6. The apparatus of claim 4 wherein said encoded position signal also includes warning/caution/advisory data, and said warning/caution/advisory data includes at least one of vehicle proximity data and vehicle collision data and active runway data.

7. The apparatus of claim 4 wherein said vehicle transmitter further comprises means for encoding vehicle information into a Mode S format such that said status signal includes said vehicle information encoded in said Mode S signal format.

8. A collision avoidance apparatus for use with an airport vehicle on an airport surface, comprising:

a. a plurality of frequency modulated transmitters, each of said plurality of frequency-modulated transmitters having a common carrier frequency signal, each of said plurality of frequency-modulated transmitters being placed at a respective predefined location on said airport surface, each of said plurality of frequency-modulated transmitters having an encoder for generating an encoded position signal indicative of said respective predefined location, each of said plurality of frequency-modulated transmitters modulating said encoded position signal onto said common carrier frequency signal, thereby generating a location signal, each of said plurality of frequency-modulated transmitters having an antenna and providing said location signal thereto, and each of said plurality of frequency-modulated transmitters transmitting a respective location signal to said airport vehicle, said airport vehicle engaging a selected location signal using the frequency-modulation capture effect;

b. a plurality of frequency-modulated receivers, each of said plurality of frequency-modulated receivers being associated with a respective one of said plurality of frequency-modulated transmitters, each of said plurality of frequency-modulated receivers receiving a vehicle signal of said airport vehicle indicative of at least one of a vehicle identity and a vehicle location on said airport surface;

c. means for transmitting said vehicle signal to a display; and d. a vehicle transceiver having an antenna capable of receiving information signals from a plurality of frequency-modulated transmitters, said plurality of frequency-modulated transmitters being located on said airport surface, a vehicle receiver connected to said antenna for engaging one of said plurality of frequency-modulated transmitters using the frequency-modulation capture effect producing a selected information signal thereby, said selected information signal containing said selected location signal, said selected location signal being unique to the location of said one relative to said airport surface, a decoder connected to said receiver for decoding said selected information signal and providing a decoded information signal to at least one of a vehicle display and a vehicle data bus, said decoded information signal including a decoded location signal indicative of the location of said one relative to said airport surface, a vehicle transmitter for transmitting a status signal indicative of at least one of a vehicle identity and a vehicle location on said airport surface; and e. a display responsive to said status signal and displaying vehicle information indicative of at least one of said vehicle identity and said vehicle location.

9. The apparatus of claim 8 wherein said information signals also include warning/caution/advisory data, and said warning/caution/advisory data includes at least one of vehicle proximity data and vehicle collision data and active runway data.

10. The apparatus of claim 8 wherein said vehicle transmitter further comprises means for encoding vehicle information into a Mode S format such that said status signal includes said vehicle information encoded in said Mode S signal format.

* * * * *